(12) United States Patent
Niyogi (10) Patent No.: US 6,252,005 B1
(45) Date of Patent: Jun. 26, 2001

(54) THERMAL OXIDATIVE STABILITY OF ACRYLIC POLYMERS

(75) Inventor: Suhas G. Niyogi, Bear, DE (US)

(73) Assignee: Montell Technology Company BV (NL)

( * ) Notice: Subject to any disclaimer, the term of this patent is extended or adjusted under 35 U.S.C. 154(b) by 0 days.

(21) Appl. No.: 09/130,976

(22) Filed: Aug. 7, 1998

(51) Int. Cl.⁷ .................................................. C08F 289/00
(52) U.S. Cl. ........................ 525/297; 525/301; 525/309; 525/313
(58) Field of Search .................... 525/297, 301, 525/309, 313

(56) References Cited

U.S. PATENT DOCUMENTS

| | | | |
|---|---|---|---|
| 4,490,507 | 12/1984 | Abe et al. | 525/263 |
| 4,599,384 | 7/1986 | Farona et al. | 525/245 |
| 4,904,404 | 2/1990 | Liu et al. | 252/51.5 |
| 5,140,074 | 8/1992 | DeNicola et al. | 525/263 |
| 5,411,994 | 5/1995 | Galli et al. | 521/50.5 |
| 5,852,124 | * 12/1998 | Wang et al. | 525/316 |

FOREIGN PATENT DOCUMENTS

| | | |
|---|---|---|
| 229 139 | * 11/1984 | (DD) . |
| 239685 | 10/1987 | (EP) . |
| 420615 | 4/1991 | (EP) . |
| 522233 | 1/1993 | (EP) . |
| 849318 | 6/1998 | (EP) . |
| 899277 | 3/1999 | (EP) . |
| 98/17701 | 4/1998 | (WO) . |

OTHER PUBLICATIONS

Glazkov, CAPLUS AN 1999:755859, 1999.*
Glazkov et al., Proizvod. Ispol'z. Elastomerov (5), p. 6–9, 1997.*
M. Ratzsch et al., "Challenges in Polypropylene by Chemical Modification", *Macromol. Symp.*, 129, p. 55–77, 1998.

* cited by examiner

*Primary Examiner*—Jeffrey Mullis (57) ABSTRACT

The thermal oxidative stability of acrylic grafted polymers is improved by (a) graft polymerizing monomers selected from the group consisting of (i) an ester or salt of an unsubstituted or 1–3 C alkyl-substituted acrylic acid and (ii) an ester or salt of an unsubstituted or 1–3 C alkyl-substituted acrylic acid and about 1 to about 10 mole %, based on the total monomers added, of an unsubstituted or 1–3 C alkyl-substituted acrylic acid, to a backbone of a propylene polymer material in the presence of a 4-vinyl-substituted 5–12 C cyclic 1-alkene, wherein the total amount of polymerized monomer is about 20 to about 200 parts per hundred parts of the propylene polymer material and the vinyl-substituted cyclic alkene is present in an amount of about 1 mole % to about 30 mole %, based on the total moles of monomer added, and (b) removing any unreacted grafting monomer from the resulting grafted propylene polymer material, decomposing any unreacted initiator, and deactivating any residual free radicals in the material, wherein steps (a) and (b) are carried out in a substantially non-oxidizing environment.

14 Claims, 3 Drawing Sheets

THERMAL OXIDATIVE STABILITY OF ACRYLIC POLYMERS

FIELD OF THE INVENTION

This invention relates to a process for making thermally stable polymers of polymerizable acrylic monomers and grafted polymers of a propylene polymer material and a polymerizable acrylic monomer.

BACKGROUND OF THE INVENTION

Alpha-substituted polymers such as polymerized methacrylates, methacrylonitriles, and alpha-methylstyrene are thermally unstable and are known to depolymerize to their corresponding monomers at temperatures greater than ~180° C., depending upon the molecular weight of the polymer. Above 300° C., poly(methyl methacrylate) (PMMA) depolymerizes rapidly at high conversions (about 95% or more). Typical extruding and molding temperatures for such polymers are 200°–290° C. Significant depolymerization to the respective monomers would occur in this temperature range, affecting the safety of the operation as well as the properties of the resulting product. Polymethacrylates, and in particular PMMA, are the alpha-substituted polymers most widely used in commercial applications. In order to broaden the range of applications for these polymers it is critical to improve their thermal oxidative stability.

In the manufacture of grafted polymers comprising a backbone of a propylene polymer material, to which is grafted PMMA, small amounts of monomers such as methyl acrylate, butyl acrylate and styrene are typically copolymerized with the methyl methacrylate to improve thermal stability, since polymers of these monomers are much more stable to heat and undergo degradation at relatively higher temperatures. However, addition of these monomers affects the mechanical properties of the resulting grafted polymers as well as the molecular weight of the polymers and the efficiency of the graft polymerization reaction.

There is still a need for a method to increase the thermal oxidative stability of grafted polymers that include polymerized acrylic monomers, compared with that achievable with the comonomers currently used for this purpose.

SUMMARY OF THE INVENTION

The graft copolymer of this invention comprises a backbone of a propylene polymer material to which is graft polymerized chains of (i) an ester or salt of an unsubstituted or 1–3 C alkyl-substituted acrylic acid or (ii) an ester or salt of an unsubstituted or 1–3 C alkyl-substituted acrylic acid and about 1 to about 10 mole %, based on the total monomers added, of an unsubstituted or 1–3 C alkyl-substituted acrylic acid, having 4-ethylidene-substituted 5–12 C cyclic 1-alkene groups at the chain ends.

Another embodiment of this invention comprises a polymer of monomers selected from the group consisting of (i) an ester or salt of an unsubstituted or 1–3 C alkyl-substituted acrylic acid and (ii) an ester or salt of an unsubstituted or 1–3 C alkyl-substituted acrylic acid and about 1 to about 10 mole %, based on the total monomers added, of an unsubstituted or 1–3 C alkyl-substituted acrylic acid, having end groups comprising 4-ethylidene-substituted 5–12 C cyclic 1-alkene groups.

In another embodiment, the method of this invention for improving the thermal oxidative stability of acrylic grafted polymers comprises:

(a) graft polymerizing monomers selected from the group consisting of (i) an ester or salt of an unsubstituted or 1–3 C alkyl-substituted acrylic acid and (ii) an ester or salt of an unsubstituted or 1–3 C alkyl-substituted acrylic acid and about 1 to about 10 mole %, based on the total monomers added, of an unsubstituted or 1–3 C alkyl-substituted acrylic acid, to a backbone of a propylene polymer material in the presence of a 4vinyl-substituted 5–12 C cyclic 1-alkene, wherein the total amount of polymerized monomer is about 20 to about 200 parts per hundred parts of the propylene polymer material and the 4-vinyl-substituted cyclic 1-alkene is present in an amount of about 1 mole % to about 30 mole %, based on the total moles of monomers added, and (b) removing any unreacted grafting monomer from the resulting grafted propylene polymer material, decomposing any unreacted initiator, and deactivating any residual free radicals in the material, wherein steps (a) and (b) are carried out in a substantially non-oxidizing environment.

The 4-ethylidene-substituted cyclic 1-alkene groups attach at the ends of the chains of polymerized acrylic monomer and significantly increase the thermal oxidative stability of grafted as well as ungrafted polymer. The room temperature mechanical properties and molecular weight of the grafted polymer, and the grafting efficiency of the process are not adversely affected.

DETAILED DESCRIPTION OF THE INVENTION

The first step in the process of this invention for improving the thermal oxidative stability of acrylic grafted polymers is graft polymerizing monomers selected from the group consisting of (i) an ester or salt of an unsubstituted or 1–3 C alkyl-substituted acrylic acid and (ii) an ester or salt of an unsubstituted or 1–3 C alkyl-substituted acrylic acid and about 1 to about 10 mole %, based on the total monomers added, of an unsubstituted or 1–3 C alkyl-substituted acrylic acid, in a substantially non-oxidizing environment, to a backbone of a propylene polymer material in the presence of a 4-vinyl-substituted 5–12 C cyclic 1-alkene. The graft copolymers have 4-ethylidene-substituted 5–12 C cyclic 1-alkene groups at the ends of the chains of polymerized acrylic monomers.

The propylene polymer material that is used as the backbone of the graft copolymer can be:

(a) a homopolymer of propylene having an isotactic index greater than 80, preferably about 85 to about 99;

(b) a copolymer of propylene and an olefin selected from the group consisting of ethylene and 4–10 C alpha-olefins, provided that when the olefin is ethylene, the maximum polymerized ethylene content is 10% by weight, preferably about 4%, and when the olefin is a 4–10 C alpha-olefin, the maximum polymerized content thereof is 20% by weight, preferably about 16%, the copolymer having an isotactic index greater than 85;

(c) a terpolymer of propylene and two olefins selected from the group consisting of ethylene and 4–8 C alpha-olefins, provided that the maximum polymerized 4–8 C alpha-olefin content is 20% by weight, preferably about 16%, and, when ethylene is one of the olefins, the maximum polymerized ethylene content is 5% by weight, preferably about 4%, the terpolymer having an isotactic index greater than 85;

(d) an olefin polymer composition comprising:
  (i) about 10% to about 60% by weight, preferably about 15% to about 55%, of a propylene homopolymer having an isotactic index greater than 80, preferably about 85 to about 98, or a copolymer selected from the group consisting of a copolymer of (a) propylene and ethylene, (b) propylene, ethylene and a 4–8 C alpha-olefin, and (c) propylene and a 4–8 C alpha-olefin, the copolymer having a polymerized propylene content of more than 85% by weight, preferably about 90% to about 99%, and an isotactic index greater than 85;
  (ii) about 5% to about 25%, preferably about 5% to about 20%, of a copolymer of ethylene and propylene or a 4–8 C alpha-olefin that is insoluble in xylene at ambient temperature, and
  (iii) about 30% to about 70%, preferably about 40% to about 65%, of an elastomeric copolymer selected from the group consisting of a copolymer of (a) ethylene and propylene, (b) ethylene, propylene, and a 4–8 C alpha-olefin, and (c) ethylene and a 4–8 C alpha-olefin, the copolymer optionally containing about 0.5% to about 10% of a polymerized diene, and containing less than 70% by weight, preferably about 10% to about 60%, most preferably about 12% to about 55%, of polymerized ethylene and being soluble in xylene at ambient temperature, and having an intrinsic viscosity of about 1.5 to about 4.0 dl/g, wherein the total amount of (ii) and (iii), based on the total olefin polymer composition, is about 50% to about 90%, the weight ratio of (ii)/(iii) is less than 0.4, preferably 0.1 to 0.3, and the composition is prepared by polymerization in at least two stages, and has a flexural modulus of less than 150 MPa; or (e) a thermoplastic olefin comprising:
  (i) about 10% to about 60%, preferably about 20% to about 50%, of a propylene homopolymer having an isotactic index greater than 80, or a copolymer selected from the group consisting of a copolymer of (a) ethylene and propylene, (b) ethylene, propylene, and a 4–8 C alpha-olefin, and (c) ethylene and a 4–8 C alpha-olefin, the copolymer having a polymerized propylene content greater than 85% and an isotactic index of greater than 85;
  (ii) about 20% to about 60%, preferably about 30% to about 50%, of an amorphous copolymer selected from the group consisting of a copolymer of (a) ethylene and propylene, (b) ethylene, propylene, and a 4–8 C alpha-olefin, and (c) ethylene and a 4–8 C alpha-olefin, the copolymer optionally containing about 0.5% to about 10% of a polymerized diene and containing less than 70% polymerized ethylene and being soluble in xylene at ambient temperature; and
  (iii) about 3% to about 40%, preferably about 10% to about 20%, of a copolymer of ethylene and propylene or a 4–8 C alpha-olefin that is insoluble in xylene at ambient temperature, wherein the thermoplastic olefin has a flexural modulus of greater than 150 but less than 1200 MPa, preferably about 200 to about 1100 MPa, most preferably about 200 to about 1000 MPa.

Room or ambient temperature is about 25° C.

4–8 C Alpha-olefins useful in the preparation of (d) and (e) include, for example, butene-1; pentene-1; hexene-1; 4-methylpentene-1, and octene-1.

The diene, when present, is typically a butadiene; 1,4-hexadiene; 1,5-hexadiene, or ethylidenenorbornene.

Propylene polymer materials (d) and (e) can be prepared by polymerization in at least two stages, where in the first stage the propylene; propylene and ethylene; propylene and an alpha-olefin, or propylene, ethylene and an alpha-olefin are polymerized to form component (i) of (d) or (e), and in the following stages the mixtures of ethylene and propylene; ethylene and the alpha-olefin, or ethylene, propylene and the alpha-olefin, and optionally a diene, are polymerized to form components (ii) and (iii) of (d) or (e).

The polymerization can be conducted in liquid phase, gas phase, or liquid-gas phase using separate reactors, all of which can be done either by batch or continuously. For example, it is possible to carry out the polymerization of component (i) using liquid propylene as a diluent, and the polymerization of components (ii) and (iii) in gas phase, without intermediate stages except for the partial degassing of the propylene. All gas phase is the preferred method.

The preparation of propylene polymer material (d) is described in more detail in U.S. Pat. Nos. 5,212,246 and 5,409,992, which patents are incorporated herein by reference. The preparation of propylene polymer material (e) is described in more detail in U.S. Pat. Nos. 5,302,454 and 5,409,992, which patents are incorporated herein by reference.

Propylene homopolymer is the preferred propylene polymer backbone material.

The monomers that are graft polymerized onto the backbone of propylene polymer material are selected from the group consisting of (i) an ester or salt of an unsubstituted or 1–3 carbon (C) alkyl-substituted acrylic acid and (ii) an ester or salt of an unsubstituted or 1–3 C alkyl-substituted acrylic acid and about 1 to about 10 mole %, based on the total monomers added, of an unsubstituted or 1–3 C alkyl-substituted acrylic acid. Methacrylic acid is the preferred substituted acrylic acid. Suitable esters include, for example, the methyl, ethyl, butyl, benzyl, phenylethyl, phenoxyethyl, epoxypropyl, and hydroxypropyl esters. Esters of 1–4 C alkanols are preferred. Methyl methacrylate is most preferred. Suitable salts include, for example, the sodium, calcium, or magnesium salts.

The graft polymerization of the acrylic monomer is carried out in the presence of a 4-vinyl-substituted 5–12 C cyclic 1-alkene, preferably 4vinyl-1-cyclohexene. The 4-vinyl-substituted cyclic 1-alkene is present in an amount of about 1 mole % to about 30 mole %, preferably about 2 to about 16 mole %, based on the total moles of monomers added. Nuclear magnetic resonance studies have shown that the 4-vinyl-substituted cyclic 1-alkene does not polymerize or copolymerize by a free radical mechanism and groups derived from 4-vinyl-substituted cyclic 1-alkenes by rearrangement of the double bonds are present only at the ends of the chains of polymerized acrylic monomer. For example, when 4-vinyl-1-cyclohexene reacts at the ends of the chains of polymerized acrylic monomer, 4-ethylidenecyclohex-1-ene groups are formed.

It is known that low molecular weight polymers are less stable than those with high molecular weight. The 4vinyl-substituted cyclic 1-alkenes of this invention are effective in thermal oxidative stabilization of both grafted and ungrafted acrylic polymers in which the $M_n$ of the polymerized acrylic monomer is as low as 1000 and the polydispersity ($M_w/M_n$) is about 3.

The total amount of polymerized monomers is about 20 to about 200 parts, preferably about 20 to about 100 parts, per hundred parts of the propylene polymer material.

The grafted polymer can be made according to any one of various methods. One of these methods involves forming active grafting sites on the propylene polymer material by treatment with a peroxide or other chemical compound that is a free radical polymerization initiator, or by irradiation with high energy ionizing radiation. The free radicals produced in the polymer as a result of the chemical or irradiation treatment form active grafting sites on the polymer and initiate the polymerization of the monomers at these sites. Grafted polymers produced by peroxide-initiated grafting methods are preferred.

During the graft polymerization, the monomers also polymerize to form a certain amount of free or ungrafted polymer or copolymer. The morphology of the grafted polymer is such that the propylene polymer material is the continuous or matrix phase, and the polymerized monomers, both grafted and ungrafted, are a dispersed phase. The reaction of the 4-vinyl-substituted cyclic 1-alkenes at the ends of the chains of the polymerized acrylic monomers increases the thermal oxidative stability of both the grafted and ungrafted polymerized monomers.

The last step of the process of this invention is removing any unreacted grafting monomer from the resulting grafted propylene polymer material, decomposing any unreacted initiator, and deactivating any residual free radicals in the material. This step is carried out in a substantially non-oxidizing environment.

The expression "substantially non-oxidizing environment" means an environment in which the active oxygen concentration, i.e., the concentration of oxygen in a form that will react with the free radicals in the polymer material, is less than about 15%, preferably less than about 5%, and most preferably less than about 1%, by volume. The most preferred concentration of active oxygen is 0.004% or lower by volume. Within these limits, the non-oxidizing atmosphere can be any gas, or mixture of gases, which is oxidatively inert toward the free radicals in the propylene polymer material, e.g., nitrogen, argon, helium and carbon dioxide.

Preparation of grafted polymers by contacting the propylene polymer with a free radical polymerization initiator such as an organic peroxide and a vinyl monomer is described in more detail in U.S. Pat. No. 5,140,074, which is incorporated herein by reference.

Preparation of grafted polymers by irradiating an olefin polymer and then treating with a vinyl monomer is described in more detail in U.S. Pat. No. 5,411,994, which is incorporated herein by reference.

Compositions containing the grafted polymers of this invention can easily be impact-modified by the addition of one or more rubber components selected from the group consisting of (i) an olefin copolymer rubber, (ii) a monoalkenyl aromatic hydrocarbon-conjugated diene block copolymer, and (iii) a core-shell rubber. Any of these rubber components can have acid or anhydride functionality or can be free of these functional groups. The preferred rubber components are (i) and (ii), either alone or in combination.

Suitable olefin copolymer rubbers include, for example, saturated olefin copolymer rubbers such as ethylene/propylene monomer rubbers (EPM), ethylene/octene-1, and ethylene/butene-1 rubbers, and unsaturated olefin terpolymer rubbers such as ethylene/propylene/diene monomer rubbers (EPDM). The preferred olefin copolymer rubbers are ethylene/propylene, ethylene/butene-1, and ethylene/octene-1 copolymer rubbers.

The monoalkenyl aromatic hydrocarbon-conjugated diene block copolymer can be a thermoplastic elastomer of the A-B (or diblock) structure, the linear A-B-A (or triblock) structure, the radial $(A-B)_n$ type where n=3–20%, or a combination of these structure types, wherein each A block is a monoalkenyl aromatic hydrocarbon polymer block, and each B block is an unsaturated rubber block. Various grades of copolymers of this type are commercially available. The grades differ in structure, molecular weight of the mid and end blocks, and ratio of monoalkenyl aromatic hydrocarbon to rubber. The block copolymer can also be hydrogenated Typical monoalkenyl aromatic hydrocarbon monomers are styrene, ring-substituted 1–4 C linear or branched alkyl styrenes, and vinyltoluene. Styrene is preferred. Suitable conjugated dienes include, for example, butadiene and isoprene. Preferred block copolymers are hydrogenated styrene/ethylene-butene/styrene triblock copolymers.

The weight average molecular weight ($M_w$) of the block copolymers generally will be in the range of about 45,000 to about 260,000 g/mole, average molecular weights in the range of about 50,000 to about 125,000 g/mole being preferred because they produce compositions having the best balance of impact strength and stiffness. Also, while block copolymers having unsaturated as well as saturated rubber blocks can be used, copolymers having saturated rubber blocks are preferred, also on the basis of the impact/stiffness balance of the compositions containing them. The weight ratio of monoalkenyl aromatic hydrocarbon to conjugated diene rubber in the block copolymer is in the range of about 5/95 to about 50/50, preferably about 10/90 to about 40/60.

The core-shell rubber components comprise small particles of crosslinked rubber phase surrounded by a compatibilizing shell, normally a glassy polymer or copolymer. The core is typically a diene rubber such as butadiene or isoprene, or an acrylate. The shell is typically a polymer of two or more monomers selected from styrene, methyl methacrylate, and acrylonitrile. Particularly preferred core-shell rubbers have an acrylate core.

Suitable impact modifiers include, for example, Engage 8100, 8150, and 8200 ethylene/octene-1 copolymers, commercially available from DuPont Dow Elastomers; EPM 306P random ethylene/propylene copolymer, commercially available from Miles Inc., Polysar Rubber Division; Kraton G 1652 styrene/ethylene-butene/styrene triblock copolymer, commercially available from Shell Chemical Company; Exact ethylene/butene-1 copolymers, commercially available from Exxon Chemical Company, and KS080 and KS350 heterophasic polyolefins, commercially available from Montell USA Inc.

The impact modifier, if present, is used in an amount of about 2% to about 30%, preferably about 5% to about 15%, by weight, based on the total weight of the composition.

The composition can also contain a broad molecular weight distribution ($M_w/M_n$) propylene polymer material (BMWD PP). The BMWD PP has a $M_w/M_n$ of about 5 to about 60, preferably about 5 to about 40; a melt flow rate of about 0.5 to about 50, preferably about 1 to about 30, g/10 min, and xylene insolubles at 25° C. of greater than or equal to 94%, preferably greater than or equal to 96%, and most preferably greater than or equal to 98%. The propylene polymer material having a broad molecular weight distribution can be a homopolymer of propylene or an ethylene/propylene rubber impact-modified homopolymer of propylene, wherein the propylene homopolymer has a broad molecular weight distribution.

The BMWD PP can be prepared by sequential polymerization in at least two stages, in the presence of a Ziegler-Natta catalyst supported on magnesium halide in active form. The polymerization process occurs in separate and consecutive stages, and in each stage polymerization takes place in the presence of the polymer and the catalyst coming from the preceding stage.

The polymerization process can be carried out in a batch or in a continuous mode according to known techniques, operating in liquid phase in the presence or not of an inert diluent, or in gas phase, or liquid-gas phase, preferably in gas phase. The preparation of the BMWD PP is described in more detail in U.S. Pat. No. 5,286,791, which patent is incorporated herein by reference.

The BMWD PP, if present, is used in an amount of about 5% to about 90%, preferably about 10% to about 70%, based on the total weight of the composition.

Other additives such as fillers and reinforcing agents, e.g., carbon black and glass fibers, as well as inorganic powders such as calcium carbonate, talc, and mica; pigments; slip agents; waxes; oils; antiblocking agents, and antioxidants can also be present.

Polymers of monomers selected from the group consisting of (i) an ester or salt of an unsubstituted or 1–3 C alkyl-substituted acrylic acid and (ii) an ester or salt of an unsubstituted or 1–3 C alkyl-substituted acrylic acid and about 1 to about 10 mole %, based on the total monomers added, of an unsubstituted or 1–3 C alkyl-substituted acrylic acid, having end groups comprising 4-ethylidene-substituted 5–12 C cyclic 1-alkene groups can be prepared by polymerizing the monomer in a hydrocarbon solvent in the presence of about 1 mole % to about 30 mole %, preferably about 2 mole % to about 16 mole %, based on the total moles of monomer added, of a 4-vinyl-substituted 5–12 C cyclic 1-alkene. A free radical polymerization initiator such as an organic peroxide is used. The polymerization can also be carried out in water emulsion in the presence of a suitable emulsifier and a water-soluble free radical initiator.

The test methods used to evaluate the molded specimens were:

| | |
|---|---|
| Flexural modulus | ASTM D-790-86 |
| Tensile strength | ASTM D-638-89 |
| Elongation @ yield | ASTM D-638-89 |
| Melt flow rate, 230° C., 3.8 kg | ASTM 1238 |

The porosity of the propylene homopolymer used as the backbone polymer in the manufacture of graft copolymers is measured as described in Winslow, N. M. and Shapiro, J. J., "An Instrument for the Measurement of Pore-Size Distribution by Mercury Penetration," ASTM Bull., TP 49, 3944 (February 1959), and Rootare, H. M., "Review of Mercury Porosimetry," 225–252 (In Hirshhom, J. S. and Roll, K. H., Eds., *Advanced Experimental Techniques in Powder Metallurgy*, Plenum Press, New York 1970).

Isotactic index is defined as the xylene insoluble fraction. The weight percent of olefin polymer soluble in xylene at room temperature is determined by dissolving 2.5 g of the polymer in 250 ml of xylene in a vessel equipped with a stirrer that is heated at 135° C. with agitation for 20 minutes. The solution is cooled to 25° C. while continuing the agitation, and then left to stand without agitation for 30 minutes so that the solids can settle. The solids are filtered with filter paper, the remaining solution is evaporated by treating it with a nitrogen stream, and the solid residue is vacuum dried at 80° C. until a constant weight is reached. The percent by weight of polymer insoluble in xylene at room temperature is the isotactic index of the polymer. The value obtained in this manner corresponds substantially to the isotactic index determined via extraction with boiling n-heptane, which by definition constitutes the isotactic index of the polymer.

Intrinsic viscosity was measured in tetrahydronaphthalene at 135° C.

Molecular weight measurements were made by gel permeation chromatography.

In this specification, all parts and percentages are by weight unless otherwise noted.

EXAMPLE 1

This example demonstrates the thermal oxidative stability of a grafted polymer comprising a propylene homopolymer backbone, to which was graft polymerized poly(methyl methacrylate) having 4-ethylidenecyclohex-1-ene groups at the ends of the polymerized methyl methacrylate chains (PP-g-PMMA/VCH), compared with polypropylene to which was grafted polymerized a methyl methacrylate/styrene copolymer (PP-g-PMMA-co-St) or a methyl methacrylate/methyl acrylate copolymer (PP-g-PMMA-co-MeAc).

In this and the following examples the propylene homopolymer used as the backbone polymer had the following properties: spherical form, melt flow rate (MFR) of 9 g/10 min, a porosity of 0.45 cm$^3$/g and a weight average molecular weight ($M_w$) of 170,000.

The PP-g-PMMA VCH grafted polymer was prepared as follows. The MMA was graft polymerized onto the polypropylene backbone at a temperature of 92° C. using the previously described peroxide-initiated graft polymerization process, in the presence of 10 mole % 4-vinyl-1- cyclohexene. Forty-five parts by weight of monomer were added per 100 parts of polypropylene. Tert-butylperoxy pivalate (75 wt. % solution in odorless mineral spirits) was used as the peroxide initiator. The monomers were fed at a rate of ~1.1 pph/min for 42 minutes. A monomer to initiator molar ratio of 91 was used. After the addition of monomers the mixture was stirred at the same temperature for another 2.5 hours under a nitrogen purge. The conversion of monomer to polymer was 79%.

The PP-g-PMMA-o-MeAc graft copolymer was prepared as follows. The monomers were grafted onto the polypropylene backbone at a grafting temperature of 92°–95° C. 48.8 Parts by weight of monomers were added per 100 parts of polypropylene. Tert-butylperoxy pivalate was used as the initiator at a monomer to initiator molar ratio of 100. The monomers were fed at a rate of 1.4 pph/min over a period of 35 minutes. After the addition of the monomers the mixture was stirred at the same temperature for another 2.5 hours under a nitrogen purge. The conversion of monomers to polymer was 93%.

The PP-g-PMMA-co-St graft copolymer was prepared as follows. Fifty parts by weight of monomers were added per 100 parts of polypropylene at a reaction temperature of 92° C. Tert-butylperoxy pivalate was used as the initiator at a monomer to initiator molar ratio of 100. The monomers were fed at a rate of 1.24 pph/min over a period of 30 minutes. After the addition of the monomers the mixture was stirred at the same temperature for another 2.5 hours under a nitrogen purge. The conversion of monomers to polymer was 94%.

The graft copolymers were stabilized with 0.14% Irganox B215, a mixture of 1 part Irganox 1010 tetrakis[methylene (3,5-di-tert-butyl-4-hydroxyhydrocinnamate)]-methane stabilizer and 2 parts Irgafos 168 tris(2,4-di-tert-butylphenyl) phosphite stabilizer, commercially available from Ciba Specialty Chemicals Company, and 0.06% calcium stearate.

Figure 1:
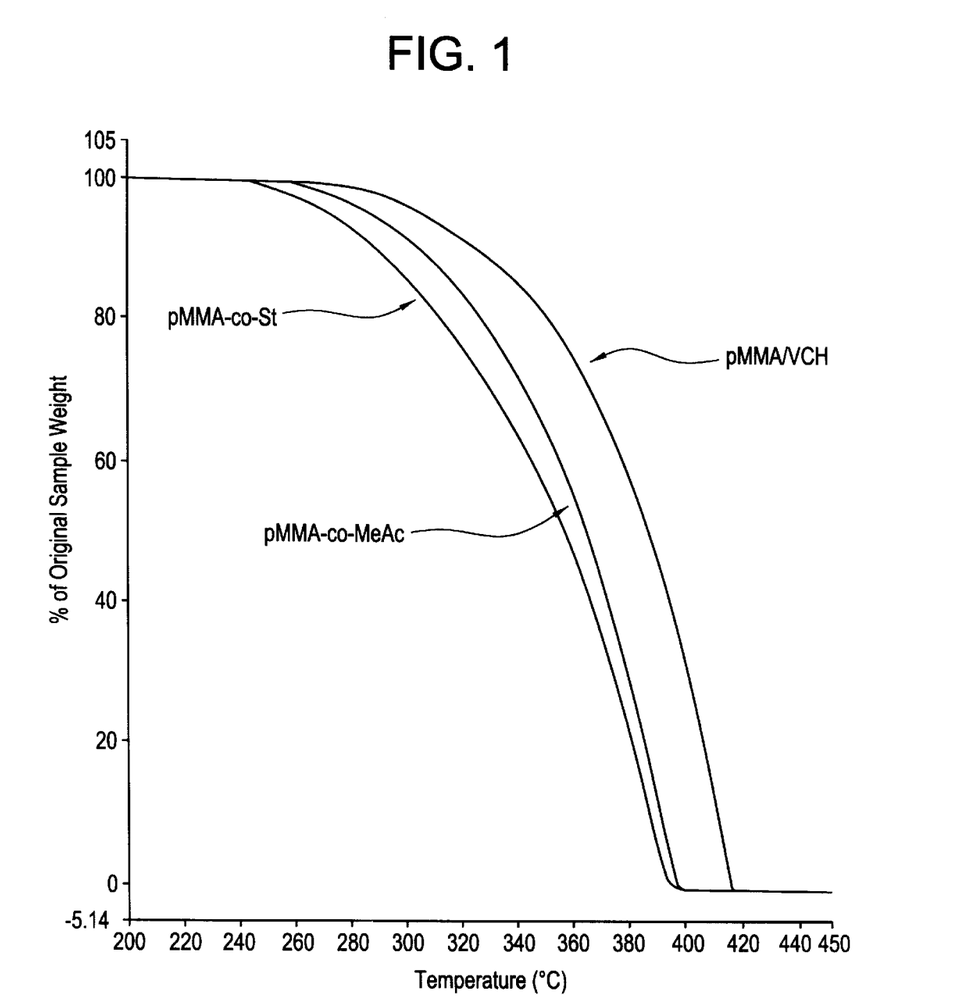
FIG. 1 is a plot of temperature (°C.) against the % of the original weight of the grafted polymer and shows the weight loss during thermogravimetric analysis (TGA) in air and therefore the thermal oxidative stability of the grafted polymers. The grafted polymers comprise a backbone of propylene homopolymer, to which was grafted poly(methyl methacrylate) having 4-ethylidenecyclohex-1-ene (VCH) groups at the chain ends (PMMA/VCH), polypropylene grafted with poly(methyl methacrylate-co-methyl acrylate) (PMMA-co-MeAc), and polypropylene grafted with poly (methyl methacrylate-co-styrene) (PMMA-co-St). The number average molecular weight ($M_n$) of the free poly(methyl methacrylate) (PMMA) was 75,000–90,000.

The thermal oxidative stability of the pelletized samples was assessed by thermogravimetric analysis (TGA) using a Perkin-Elmer TGA-7 analyzer. About 15 mg of sample were scanned at 10° C./min in air from 25° C. to 900° C. and the weight loss was monitored. The region of interest lies between 200° C. and 350° C., where poly(methyl methacrylate) tends to lose weight by depolymerization. The results are shown in FIG. 1. The weight average molecular weight ($M_w$) and number average molecular weight ($M_n$) of the free PMMA in the polymers are given in Table 1.

The data show that the grafted polymer having 4-ethylidenecyclohex-1-ene groups at the ends of the polymerized methyl methacrylate chains was more stable at a given temperature than the PP-g-PMMA-co-MeAc or PP-g-PMMA—St graft copolymers.

EXAMPLE 2

This example demonstrates the physical properties of a graft copolymer comprising a propylene homopolymer backbone, to which was graft polymerized poly(methyl methacrylate) having 4-ethylidenecyclohex-1-ene groups at the ends of the PMMA chains, compared with polypropylene grafted with poly(methyl methacrylate-co-methyl acrylate) or poly(methyl methacrylate-co-styrene).

The graft copolymers were prepared as described in Example 1 and the same stabilizers in the same amounts as in Example 1 were used.

The samples were dried at 80° C. for at least 4 hours prior to molding to remove surface moisture. One inch×⅛ inch test bars were used for all of the physical property measurements. The samples were extruded on a Haake mixer and test bars were produced on a 5 oz Battenfeld injection molding machine at a barrel temperature of 465° F. and a mold temperature of 145° F. The results of the property evaluations for each sample as well as the $M_n$ and $M_w$ of the free poly(methyl methacrylate) (PMMA) are given in Table 1.

TABLE 1

| Graft Copolymer | PP-g-PMMA-co-St | PP-g-PMMA-co-MeAc | PP-g-PMMA/VCH |
|---|---|---|---|
| $M_w$ PMMA | 525000 | 453000 | 522000 |
| $M_n$ PMMA | 89000 | 75000 | 90000 |
| MFR (g/10 min) | 4.2 | 3.2 | 4.9 |
| Flex Mod 1% Sec (kpsi) | 247 | 256 | 242 |
| Tensile Strength @ yield (kpsi) | 5.3 | 5.4 | 5.3 |
| Elongation @ Yield (1%) | 4.9 | 4.8 | 5.6 |

The data show that the graft copolymer containing 4-ethylidenecyclohex-1-ene groups at the end of the PMMA chains exhibited properties similar to those of the PP-g-(PMMA-co-MeAc) or PP-g-(PMMA-co-St) graft copolymers.

EXAMPLE 3

This example demonstrates the thermal oxidative stability of a polymer comprising poly(methyl methacrylate) having 4-ethylidenecyclohex-1-ene groups at the ends of the PMMA chains and containing various amounts of 4-hylidenecyclohex-1-ene groups, compared with poly (methyl methacrylate) and poly(methyl methacrylate-co methyl acrylate) containing various amounts of polymerized methyl acrylate.

The PMMA was prepared as follows. The monomer was polymerized in toluene at a temperature of 85° C. over a period of 3 hours. Tert-butylperoxy pivalate was used as the peroxide initiator at a monomer to initiator molar ratio of 40. The conversion of monomer to polymer was 70%.

The PMMA-co-MeAc copolymers were prepared as described above except that 4.8 and 9.1 mole % respectively of MeAc were added to the MMA.

The PP-g-PMMA/VCH polymers were prepared as described above except that 2.2, 4.4 and 8.4 mole % respectively of VCH were added to the MMA These polymers were not stabilized.

Figure 2:
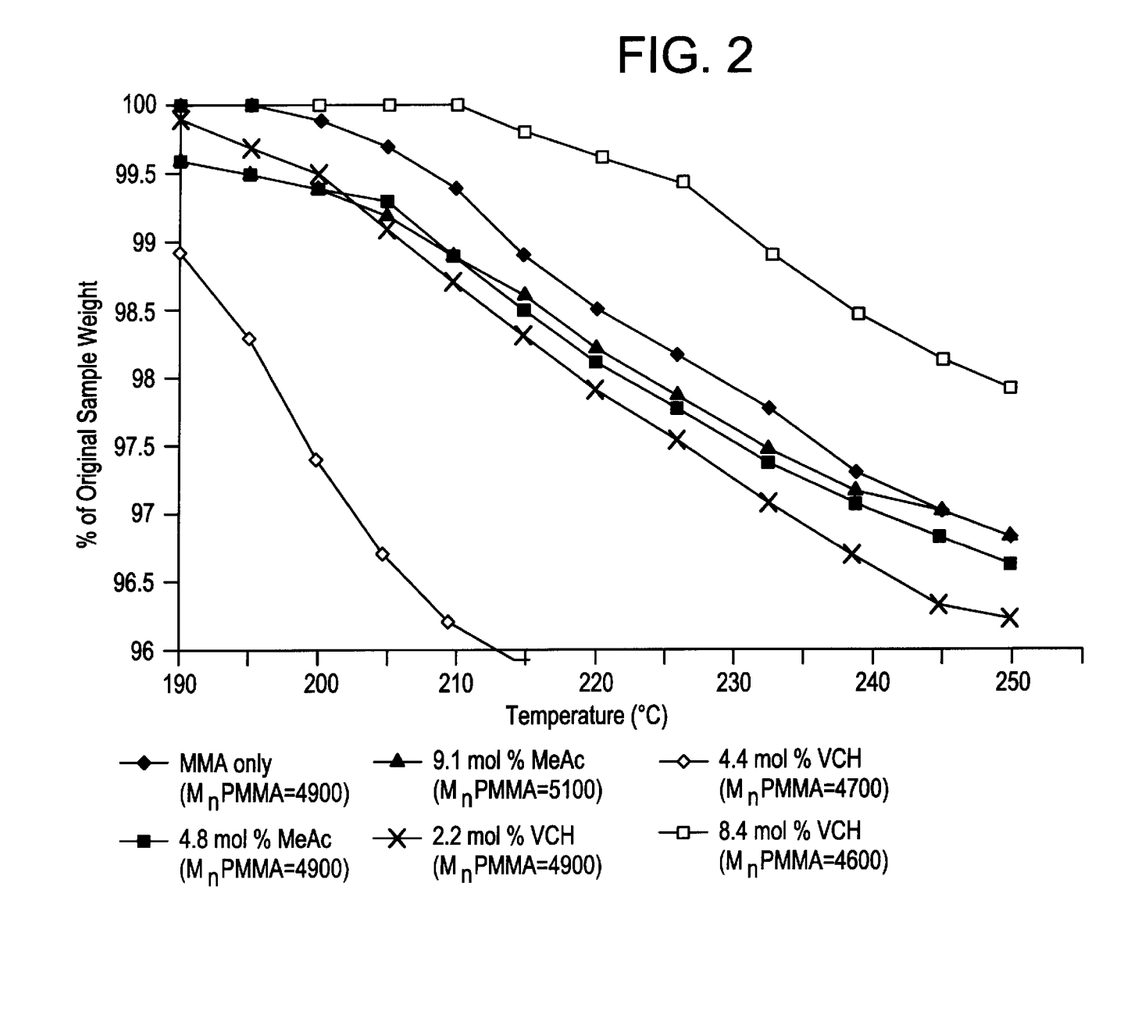
FIG. 2 is a plot of temperature (°C.) against the % of the original weight of the polymer and shows the weight loss during TGA in air and therefore the thermal oxidative stability of the polymers. The polymers comprise poly (methyl methacrylate) having 4-ethylidenecyclohex-1-ene groups at the chain ends and containing various amounts of 4-ethylidenecyclohex-1-ene groups, poly(methyl methacrylate), and poly(methyl methacrylate-co-methyl acrylate) containing various amounts of polymerized methyl acrylate. The $M_n$ of the PMMA was 4600–5100.

The thermal oxidative stability of the polymers was assessed as described in Example 1. The results are shown in FIG. 2. The $M_n$ of the PMMA is given for each sample.

The data show that the polymers having 4-ethylidenecyclohex-1-ene groups at the ends of the chains of PMMA and containing various amounts of 4-ethylidenecyclohex-1-ene groups were more stable at a given temperature than PMMA or poly(methyl methacrylate-co-methyl acrylate) containing various amounts of polymerized methyl acrylate. A determination that the oxidative thermal stability of the PMMA increases when 4-ethylidenecyclohex-1-ene groups are present at the chain ends, is an indication that chains of graft polymerized PMMA with 4-ethylidenecyclohex-1-ene groups at the chain ends will also be more stable.

EXAMPLE 4

This example demonstrates the thermal oxidative stability of low molecular weight poly(methyl methacrylate) having 4-ethylidenecyclohex-1-ene groups at the ends of the PMMA chains and containing various amounts of 4-ethylidenecyclohex-1-ene groups, compared with poly (methyl methacrylate) and poly(methyl methacrylate-co-methyl acrylate) containing various amounts of polymerized methyl acrylate.

The PMMA was prepared as follows. The monomer was polymerized at a temperature of 90° C. in toluene over a period of 2 hours. Tert-butylperoxy pivalate was used as the peroxide initiator at a monomer to initiator molar ratio of 13.5. The % conversion of monomer to polymer is given in Table 2.

The poly(MMA-co-MeAc) copolymers were prepared as described above except that 8.4 and 16.5 mole % respectively of MeAc were added to the MMA.

The PMMA/VCH polymers were prepared as described above except that 7.7 and 15.3 mole % respectively of VCH were added to the MMA.

These polymers were not stabilized for the thermal study.

Figure 3:
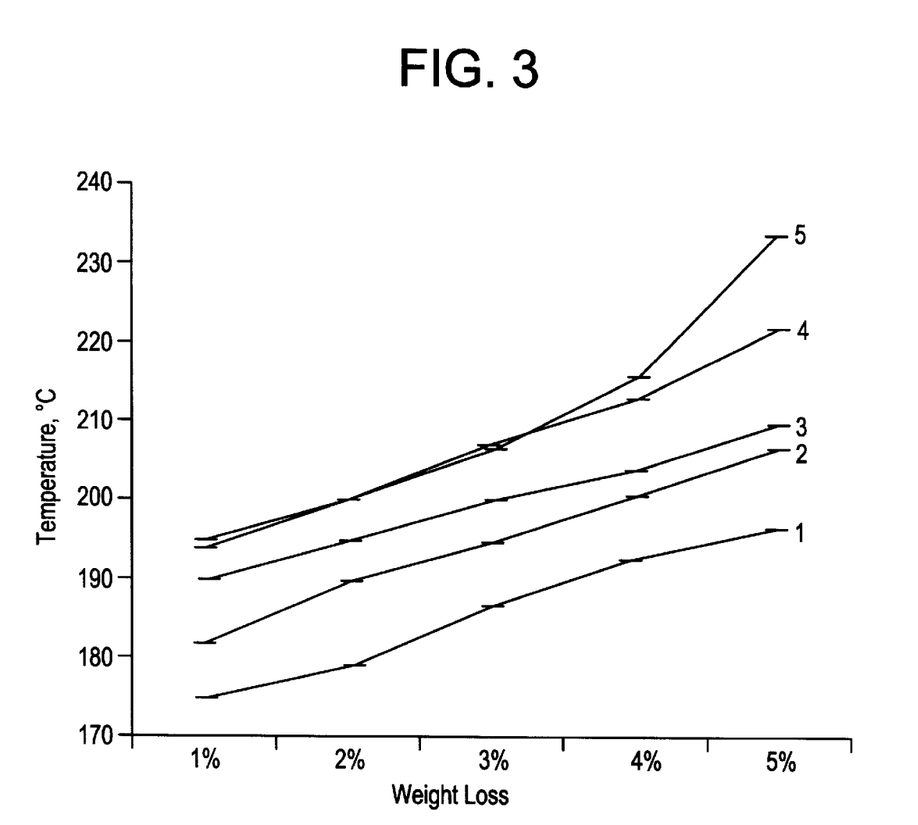
FIG. 3 is a plot of temperature (°C.) against the weight loss of polymers of much lower molecular weight and shows the % weight loss during TGA in air and therefore the thermal oxidative stability of the polymers. The polymers comprise poly(methyl methacrylate) having 4-ethylidenecyclohex-1-ene groups at the chain ends and containing various amounts of 4-ethylidenecyclohex-1-ene groups (4, 5), poly(methyl methacrylate) (1), and poly (methyl methacrylate-co-methyl acrylate) containing various amounts of polymerized methyl acrylate (2, 3). The $M_n$ of the PMMA was 981–1399.

The thermal oxidative stability of the samples were assessed as described in Example 1. The results are shown in FIG. 3. Sample 1 was PMMA, Sample 2 was poly MA-co-MeAc) (8.4 mole % MeAc), Sample 3 was poly (MMA-co-MeAc) (16.5 mole % MeAc), Sample 4 was PMMA/VCH) (7.7 mole % VCH) and Sample 5 was PMMA/VCH (15.3 mole % VCH).

The $M_w$ and $M_n$ of the PMMA, and % weight loss at 2000 and 250° C. for each sample are given in Table 2.

TABLE 2

| Sample | 1 | 2 | 3 | 4 | 5 |
|---|---|---|---|---|---|
| MeAc (mol %) | 0 | 8.4 | 16.5 | 0 | 0 |
| VCH (mol %) | 0 | 0 | 0 | 7.7 | 15.3 |
| Conversion (%) | 60 | 65 | 60 | 70 | 65 |
| $M_w$ PMMA | 4009 | 4156 | 4867 | 3078 | 3405 |
| $M_n$ PMMA | 1399 | 1392 | 1278 | 1224 | 981 |
| Thermal Stability | | | | | |
| Wt. Loss (%) (200° C.) | 5.7 | 3.5 | 3.2 | 1.6 | 1.3 |
| Wt. Loss (%) (250° C.) | 14.1 | 9.7 | 8.9 | 6.8 | 5.8 |

The data show that the polymers containing various amounts of 4-ethylidenecyclohex-1-ene groups at the ends of the PMMA chains were more stable at a given temperature than the PMMA or poly(methyl methacrylate-co-methyl acrylate) containing various amounts of polymerized methyl acrylate. A determination that the thermal oxidative stability of the PMMA increases when 4-ethylidenecyclohex-1-ene groups are present at the chain ends, is an indication that chains of graft polymerized PMMA with 4-ethylidenecyclohex-1-ene groups at the chain ends will also be more stable.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

I claim:

1. A graft copolymer comprising a backbone of a propylene polymer material to which is graft polymerized chains of monomers selected from the group consisting of (i) an ester or salt of an unsubstituted acrylic acid or an acrylic acid substituted at the α-carbon atom by a 1–3 C alkyl group and (ii) an ester or salt of an unsubstituted acrylic acid or an acrylic acid substituted at the a-carbon atom by a 1–3 C alkyl group and about 1 to about 10 mole %, based on the total monomers added, of an unsubstituted acrylic acid or an acrylic acid substituted at the α-carbon atom by a 1–3 C alkyl group, having 4-ethylidene-substituted 5–12 C cyclic 1-alkene groups derived from a 4-vinyl-substituted 5–12 C cyclic 1-alkene at the chain ends.

2. The graft copolymer of claim 1 wherein the propylene polymer material is selected from the group consisting of
   (a) a homopolymer of propylene having an isotactic index greater than 80;
   (b) a copolymer of propylene and an olefin selected from the group consisting of ethylene and 4–10 C alpha-olefins, provided that when the olefin is ethylene, the maximum polymerized ethylene content is 10% by weight and when the olefin is a 4–10 C alpha-olefin, the maximum polymerized content thereof is 20% by weight, the copolymer having an isotactic index greater than 85;
   (c) a terpolymer of propylene and two olefins selected from the group consisting of ethylene and 4–8 C alpha-olefins, provided that the maximum polymerized 4–8 C alpha-olefin content is 20% by weight, and, when ethylene is one of the olefins, the maximum polymerized ethylene content is 5% by weight, the terpolymer having an isotactic index greater than 85;
   (d) an olefin polymer composition comprising:
      (i) about 10% to about 60% by weight of a propylene homopolymer having an isotactic index greater than 80, or a copolymer selected from the group consisting of a copolymer of (a) propylene and ethylene, (b) propylene, ethylene and a 4–8 C alpha-olefin, and (c) propylene and a 4–8 C alpha-olefin, the copolymer having a polymerized propylene content of more than 85% by weight and an isotactic index greater than 85;
      (ii) about 5% to about 25% of a copolymer of ethylene and propylene or a 4–8 C alpha-olefin that is insoluble in xylene at ambient temperature, and
      (iii) about 30% to about 70% of an elastomeric copolymer selected from the group consisting of a copolymer of (a) ethylene and propylene, (b) ethylene, propylene, and a 4–8 C alpha-olefin, and (c) ethylene and a 4–8 C alpha-olefin, the copolymer optionally containing about 0.5% to about 10% of a polymerized diene, and containing less than 70% by weight of polymerized ethylene and being soluble in xylene at ambient temperature, and having an intrinsic viscosity of about 1.5 to about 4.0 dl/g,
      wherein the total amount of (ii) and (iii), based on the total olefin polymer composition, is about 50% to about 90%, the weight ratio of (ii)/(iii) is less than 0.4, and the composition is prepared by polymerization in at least two stages, and has a flexural modulus of less than 150 MPa; or
   (e) a thermoplastic olefin comprising:
      (i) about 10% to about 60% of a propylene homopolymer having an isotactic index greater than 80, or a copolymer selected from the group consisting of a copolymer of (a) ethylene and propylene, (b) ethylene, propylene, and a 4–8 C alpha-olefin, and (c) ethylene and a 4–8 C alpha-olefin, the copolymer having a polymerized propylene content greater than 85% and an isotactic index of greater than 85;
      (ii) about 20% to about 60% of an amorphous copolymer selected from the group consisting of a copolymer of (a) ethylene and propylene, (b) ethylene, propylene, and a 4–8 C alpha-olefin, and (c) ethylene and a 4–8 C alpha-olefin, the copolymer optionally containing about 0.5% to about 10% of a polymerized diene and containing less than 70% polymerized ethylene and being soluble in xylene at ambient temperature; and (iii) about 3% to about 40% of a copolymer of ethylene and propylene or a 4–8 C alpha-olefin that is insoluble in xylene at ambient temperature, wherein the thermoplastic olefin has a flexural modulus of greater than 150 but less than 1200 MPa.

3. The graft copolymer of claim 2 wherein the propylene polymer material is a propylene homopolymer.

4. The graft copolymer of claim 1 wherein an ester of an acrylic acid substituted at the α-carbon atom by a 1–3 C alkyl group is graft polymerized.

5. The graft copolymer of claim 4 wherein the ester is methyl methacrylate.

6. The graft copolymer of claim 1 wherein the 4-vinyl-substituted cyclic 1-alkene is 4-vinyl-1-cyclohexene.

7. The graft copolymer of claim 5 wherein the 4-vinyl substituted cyclic 1-alkene is 4-vinyl-1-cyclohexene.

8. A method for improving the thermal oxidative stability of acrylic grafted polymers comprising:

(a) graft polymerizing monomers selected from the group consisting of (i) an ester or salt of an unsubstituted acrylic acid or an acrylic acid substituted at the α-carbon atom by a 1–3 C alkyl group and (ii) an ester or salt of an unsubstituted acrylic acid or an acrylic acid substituted at the α-carbon atom by a 1–3 C alkyl group and about 1 to about 10 mole %, based on the total monomers added, of an unsubstituted acrylic acid or an acrylic acid substituted at the a-carbon atom by a 1–3 C alkyl group, to a backbone of a propylene polymer material in the presence of a 4-vinyl-substituted 5–12 C cyclic 1-alkene, wherein the total amount of polymerized monomers is about 20 to about 200 parts per hundred parts of the propylene polymer material and the 4-vinyl-substituted cyclic 1-alkene is present in an amount of about 1 mole % to about 30 mole %, based on the total moles of monomers added, and (b) removing any unreacted grafting monomer from the resulting grafted propylene polymer material, decomposing any unreacted initiator, and deactivating any residual free radicals in the material, wherein steps (a) and (b) are carried out in a substantially non-oxidizing environment.

9. The method of claim 8 wherein the propylene polymer material is selected from the group consisting of (a) a homopolymer of propylene having an isotactic index greater than 80;

(b) a copolymer of propylene and an olefin selected from the group consisting of ethylene and 4–10 C alpha-olefins, provided that when the olefin is ethylene, the maximum polymerized ethylene content is 10% by weight and when the olefin is a 4–10 C alpha-olefin, the maximum polymerized content thereof is 20% by weight, the copolymer having an isotactic index greater than 85;

(c) a terpolymer of propylene and two olefins selected from the group consisting of ethylene and 4–8 C alpha-olefins, provided that the maximum polymerized 4–8 C alpha-olefin content is 20% by weight, and, when ethylene is one of the olefins, the maximum polymerized ethylene content is 5% by weight, the terpolymer having an isotactic index greater than 85;

(d) an olefin polymer composition comprising:

(i) about 10% to about 60% by weight of a propylene homopolymer having an isotactic index greater than 80, or a copolymer selected from the group consisting of a copolymer of (a) propylene and ethylene, (b) propylene, ethylene and a 4–8 C alpha-olefin, and (c) propylene and a 4–8 C alpha-olefin, the copolymer having a polymerized propylene content of more than 85% by weight and an isotactic index greater than 85;

(ii) about 5% to about 25% of a copolymer of ethylene and propylene or a 4–8 C alpha-olefin that is insoluble in xylene at ambient temperature, and (iii) about 30% to about 70% of an elastomeric copolymer selected from the group consisting of a copolymer of (a) ethylene and propylene, (b) ethylene, propylene, and a 4–8 C alpha-olefin, and (c) ethylene and a 4–8 C alpha-olefin, the copolymer optionally containing about 0.5% to about 10% of a polymerized diene, and containing less than 70% by weight of polymerized ethylene and being soluble in xylene at ambient temperature, and having an intrinsic viscosity of about 1.5 to about 4.0 dl/g, wherein the total amount of (ii) and (iii), based on the total olefin polymer composition, is about 50% to about 90%, the weight ratio of (ii)/(iii) is less than 0.4, and the composition is prepared by polymerization in at least two stages, and has a flexural modulus of less than 150 MPa; or (e) a thermoplastic olefin comprising:

(i) about 10% to about 60% of a propylene homopolymer having an isotactic index greater than 80, or a copolymer selected from the group consisting of a copolymer of (a) ethylene and propylene, (b) ethylene, propylene, and a 4–8 C alpha-olefin, and (c) ethylene and a 4–8 C alpha-olefin, the copolymer having a polymerized propylene content greater than 85% and an isotactic index of greater than 85;

(ii) about 20% to about 60% of an amorphous copolymer selected from the group consisting of a copolymer of (a) ethylene and propylene, (b) ethylene, propylene, and a 4–8 C alpha-olefin, and (c) ethylene and a 4–8 C alpha-olefin, the copolymer optionally containing about 0.5% to about 10% of a polymerized diene and containing less than 70% polymerized ethylene and being soluble in xylene at ambient temperature; and (iii) about 3% to about 40% of a copolymer of ethylene and propylene or a 4–8 C alpha-olefin that is insoluble in xylene at ambient temperature, wherein the thermoplastic olefin has a flexural modulus of greater than 150 but less than 1200 MPa.

10. The method of claim 9 wherein the propylene polymer material is a propylene homopolymer.

11. The method of claim 8 wherein an ester of an acrylic acid substituted at the α-carbon atom by a 1–3 C alkyl group is polymerized.

12. The method of claim 11 wherein the ester is methyl methacrylate.

13. The method of claim 8 wherein the 4vinyl-substituted cyclic 1-alkene is 4-vinyl-1-cyclohexene.

14. The method of claim 12 wherein the 4-vinyl-substituted cyclic 1-alkene is 4-vinyl-1-cyclohexene.

* * * * *